United States Patent [19]

Hatanaka et al.

[11] Patent Number: 5,199,021

[45] Date of Patent: Mar. 30, 1993

[54] METHOD OF ACCESS TO RECORDING MEDIUM, AND APPARATUS AND METHOD FOR PROCESSING INFORMATION

[75] Inventors: Katsunori Hatanaka, Yokohama; Osamu Takamatsu, Atsugi; Akihiko Yamano, Yokohama; Ryo Kuroda, Atsugi; Hiroyasu Nose, Zama; Toshihiko Miyazaki, Hiratsuka, all of Japan

[73] Assignee: Canon Kabushiki Kaisha, Tokyo, Japan

[21] Appl. No.: 685,643

[22] Filed: Apr. 16, 1991

[30] Foreign Application Priority Data

Apr. 18, 1990 [JP] Japan .................. 2-104057

[51] Int. Cl.⁵ .............................................. G11B 9/00
[52] U.S. Cl. ..................................................... 369/126
[58] Field of Search ................. 369/126, 282; 365/151

[56] References Cited

U.S. PATENT DOCUMENTS

| 4,575,822 | 3/1986 | Quate ............................. | 365/174 |
| 4,829,507 | 5/1989 | Kazan et al. ................... | 369/126 |
| 4,878,213 | 10/1989 | Kazan et al. ................... | 369/126 |

FOREIGN PATENT DOCUMENTS

| 0174860 | 3/1986 | European Pat. Off. . |
| 0272935 | 6/1988 | European Pat. Off. . |
| 0360337 | 3/1990 | European Pat. Off. . |
| 1-53363 | 3/1989 | Japan . |
| 1-53365 | 3/1989 | Japan . |
| 1-107341 | 4/1989 | Japan . |
| 1-133239 | 5/1989 | Japan . |
| 1-151035 | 6/1989 | Japan . |
| 1-154332 | 6/1989 | Japan . |
| 2182480 | 5/1987 | United Kingdom . |

OTHER PUBLICATIONS

Binning, et al., "Surface Studies by Scanning Tunneling Microscopy," Physical Review Letters, vol. 49, No. 1, Jul. 1982, pp. 57 through 60.

Primary Examiner—Jack I. Berman
Attorney, Agent, or Firm—Fitzpatrick, Cella, Harper & Scinto

[57] ABSTRACT

A method of access of a probe electrode to a recording medium having on the surface thereof an edge portion having a level difference larger than a recording recess-projection or having an electron state different from a recording electron state comprises steps of detecting the edge portion; causing the probe electrode to scan at a certain angle to the edge portion; and moving the recording medium to a direction along the edge portion. A method for processing information including recording, reproducing, and erasing of information by access of a probe electrode to a recording medium having on the surface thereof an edge portion having a level difference larger than a recording recess-projection or having an electron state different from a recording electron state comprises steps of detecting the edge portion; causing the probe electrode to scan at a certain angle to the edge portion; and applying a pulse voltage for recording or erasing, or a bias voltage for reproducing information between the recording medium and the probe electrode.

24 Claims, 9 Drawing Sheets

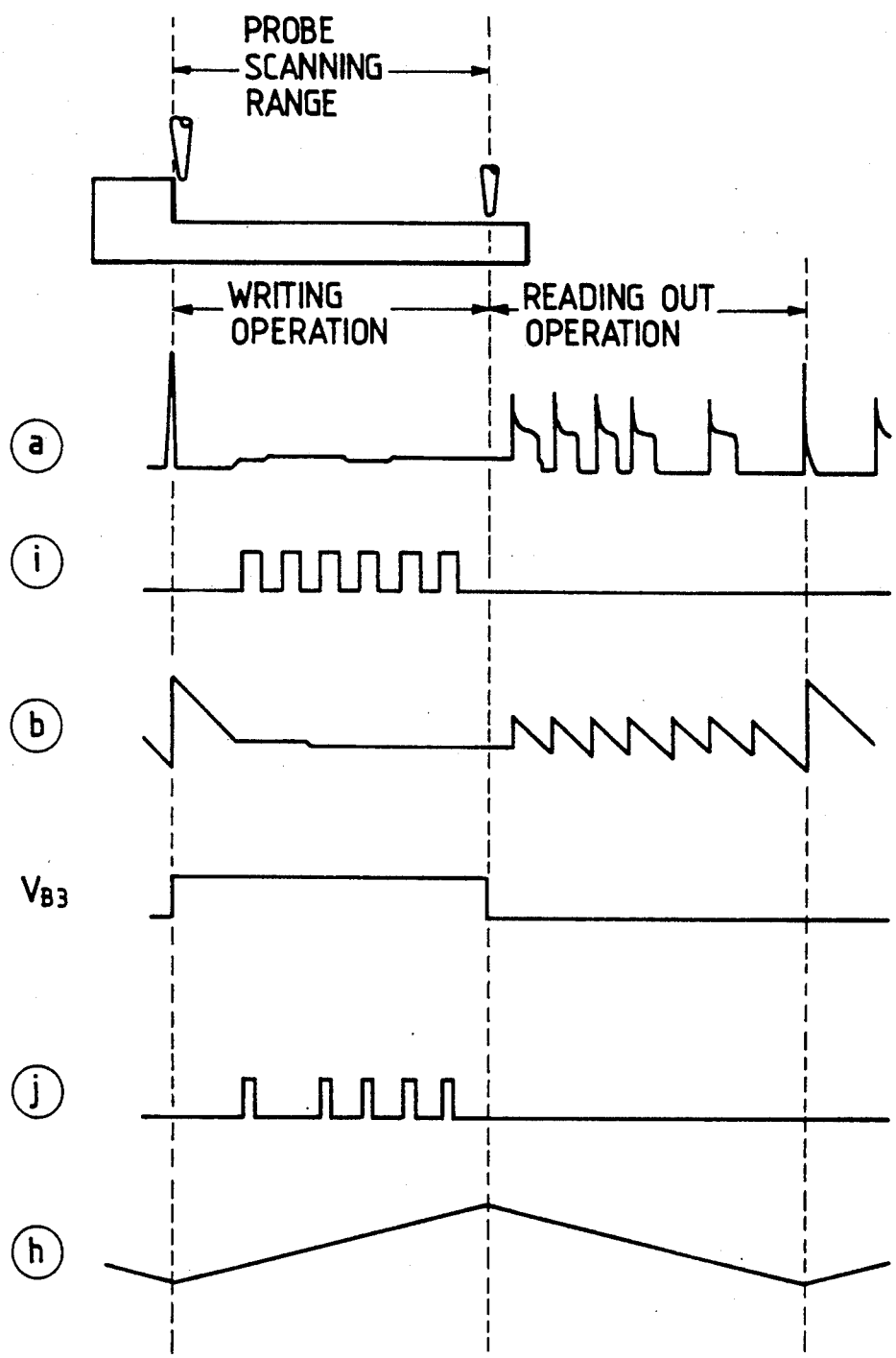

METHOD OF ACCESS TO RECORDING MEDIUM, AND APPARATUS AND METHOD FOR PROCESSING INFORMATION

BACKGROUND OF THE INVENTION

1. Field of the Invention

The present invention relates to a high-density recording medium, and a method of access thereto. More particularly, the present invention relates to a method of access to a recording-reproducing region in recording and reproduction of data by employing scanning tunnel microscopy (STM) for access and tracking with a probe.

The present invention further relates to an information-processing apparatus and an information-processing method which enable high-density recording and high-speed reproduction.

2. Related Background Art

In recent years, memory materials are utilized in a variety of application fields such as computers and related apparatuses, video discs, digital audio discs, and so forth, and are the key materials in electronics industries. Therefore, the development of the memory materials is actively being made. Generally, memory materials are required to have the performances below depending on the uses:

(1) large recording capacity in small volume,
(2) quick response in recording and reproduction,
(3) low power consumption,
(4) high productivity and low cost, and so forth.

Heretofore, magnetic memory devices and semiconductor memory devices which employ a magnetic body or a semiconductor as the base material have been principally used for the memory systems. As the results of the recent progress of laser technique, inexpensive and high-density recording mediums have come to be used which utilizes optical memory employing an organic thin film of an organic pigment, a photopolymer, or the like.

On the other hand, scanning tunnel microscopy (hereinafter referred to as "STM") has been developed which enables direct observation of the electronic structure of an atom on a surface of a conductor (G. Binnig et al., Phys. Rev. Lett. 49, 57 (1982)). The STM has enabled measurement of a real spatial image of an amorphous substance as well as a single crystal with remarkably high resolution. Further the STM has enabled observation of a variety of samples without damaging it by electric current and with low electric power in atmospheric environment. Therefor the STM is promising in a wide application fields. The STM utilizes the tunnel current which flows through a metallic probe (or a probe electrode) when the metallic probe is brought close to an electroconductive substance at a distance of about 1 nm. This current is extremely sensitive to the change of the above distance, so that various information on the entire electron cloud in a real space can be read by scanning with a probe so as to maintain the tunnel current constant. The resolution in the plane direction is approximately 0.1 nm.

Accordingly, application of the principle of the STM will make it possible to conduct high-density recording-reproduction in a dimensional order of an atom (subnanometer). For example, EP A0174860 discloses a recording-reproducing apparatus which allows writing by eliminating atom particles adsorbed on a surface of a medium by employing an electron beam or the like and allows reproduction of the data by employing STM. U.S. Pat. No. 4,575,822 discloses a method of recording by injecting electric charges into a dielectric layer formed on the surface of the medium by employing tunnel current flowing between the surface of the recording medium and a probe electrode, and a method of recording by physical or magnetic destruction of the surface of the recording medium by employing a laser beam, electron beam, a corpuscular beam, or the like.

EP A0272935 discloses a recording-reproducing method in which recording and reproducing of information is conducted by employing STM on a material giving memory effect in switching characteristics of voltage or electric current as the recording medium, for example, a thin film layer of a $\pi$-electron type organic compound or a chalcogenoid compound. This method enables a large capacity of recording and reproduction of as dense as $10^{12}$ bits/cm$^2$.

In practical apparatuses, in order to record or reproduce data to or from a memory medium, a process of "tracking", namely positioning and tracing of data lines, is necessary. Tracking methods for high density memory include:

(1) a method of writing preliminarily a marker at the reference position [Japanese Patent Application Laid-Open Nos. 64-53363, and 64-53365]

(2) a method of forming preliminarily a V-shaped groove on the surface of a recording medium, and controlling a probe electrode so as to trace continuously the center of the groove: in recording, the groove being formed and simultaneously recess-projection information being recorded in the groove, and in reading, the groove being traced [Japanese Patent Application Laid-Open Nos. 1-107341 and 151035]

(3) a method of writing or reading information along a crystal lattice arrangement in a stripe shape by utilizing arrangement of atoms in a crystal [Japanese Patent Application Laid-Open No. 1-154332].

(4) a method comprising embedding an electroconductive tracking electrode into a recording medium and conducting tracking by utilizing a tunnel current flowing between the electrode and a probe electrode [Japanese Patent Application Laid-Open No. 1-133239].

However, the aforementioned methods (1) to (4) involve disadvntages respectively as below.

In the method (1) in which the reference position is preliminarily written in, the recording data can be recorded two-dimensionally or areally and the recording density is exceedingly high owing to the high resolution characteristics of STM. In this method, however, the whole surface of the recording medium have to be scanned two-dimensionally to detect the reference position marker, which takes considerable time before the marker is detected.

In the method (2) in which a groove is formed for tracking on the surface of the medium, the groove formed is required to be in the size of 30 nm to meet the recording pit size of around 10 nm. One way to realize it is working with an ion beam. For the working of fine grooves of as small as 30 nm in a pitch in a range of from 30 to 60 nm, a super-precise stage has to be employed which works with mechanical accuracy of 3 to 6 nm. Such an apparatus is of an exceedingly large size and requires restricted operating environment, being unsuitable for memory mediums which are to be mass-produced at low cost. Although the groove may be formed by working with an electron beam or by X-ray exposure, the width of the groove formed cannot be made smaller than approximately 0.3 μm, which makes impossible the high-density recording by utilizing the high resolution of STM.

In the method (3) in which the tracking is conducted against the atomic arrangement in crystal, the high resolution of STM can be well utilized. However, a crystalline substrate cannot readily be obtained which has a complete lattice arrangement in stripe without disorder or defect throughout the required recording area of such as 1 $cm^2$ corresponding to a recording density of 10 nm/bit and a recording capacity of $10^{12}$ bits. Therefore this method cannot satisfy the requirements of low cost and high productivity for the recording medium.

In the method (4) in which a tracking signal is applied to an embedded tracking electrode and the tracking is conducted by detecting the signal with a probe, the control mechanism may be simple for a recording-reproducing apparatus. However, the provision of such an electrode and a terminal for injecting tracking signals of two or three kinds in the medium results in extremely low recording density and makes the preparation process of recording mediums complicated, which lowers the productivity and the yield of the medium, preventing supply of the mediums at low cost.

SUMMARY OF THE INVENTION

An object of the present invention is to provide a method of access for a recording medium, which is free from the above-mentioned disadvantages, realizes high-density of recording-reproducing by utilizing the characteristics of STM, and enables high-speed access to recorded position with a recording medium of low price and high productivity.

Another object of the present invention is to provide an information-processing apparatus and an information-processing method which enables high-density recording and high-speed reproduction.

According to an aspect of the present invention, there is provided a method of access of a probe electrode to a recording medium having on the surface thereof an edge portion having a level difference larger than a recording recess-projection or having an electron state different from a recording electron state: the method comprising steps of detecting the edge portion; causing the probe electrode to scan at a certain angle to the edge portion; and moving the recording medium to a direction along the edge portion.

According to another aspect of the present invention, there is provided a method of access of a probe electrode to a recording medium having on the surface thereof an edge portion having a level difference larger than a recording recess-projection or having an electron state different from a recording electron state: the method comprising steps of detecting the edge portion; deciding an azimuth angle of a data line to the edge portion; and causing the probe electrode to scan starting from the edge portion to the azimuth of the data line.

According to still another aspect of the present invention, there is provided a method for processing information including recording, reproducing, and erasing of information by access of a probe electrode to a recording medium having on the surface thereof an edge portion having a level difference larger than a recording recess-projection or having an electron state different from a recording electron state: the method comprising steps of detecting the edge portion; causing the probe electrode to scan at a certain angle to the edge portion; and applying a pulse voltage for recording or erasing, or a bias voltage for reproducing information between the recording medium and the probe electrode.

According to a further aspect of the present invention, there is provided a method for processing information including recording, reproducing, and erasing of information by making access of a probe electrode to a recording medium having on the surface thereof an edge portion having a level difference larger than a recording recess-projection or having an electron state different from a recording electron state: the method comprising steps of detecting the edge portion; deciding an azimuth angle of a data line to the edge portion; causing the probe electrode to scan starting from the edge portion to the direction of the azimuth of the data line; and applying a pulse voltage for recording or erasing, or a bias voltage for reproducing information between the recording medium and the probe electrode.

According to a still further aspect of the present invention, there is provided an information-processing apparatus: comprising a recording medium having on the surface thereof an edge portion having a level difference larger than a recording recess-projection or having an electron state different from a recording electron state; a probe electrode capable of making access to the recording medium for processing operation including recording, reproduction, and erasing of information; a means for adjusting the gap between the recording medium and the probe electrode; a means for detecting the edge portion of the recording medium; a means for causing the probe electrode to scan at a certain angle relative to the recording medium starting from the edge portion; and a means for applying a pulse voltage for recording or erasing, or a bias voltage for reproducing between the recording medium and the probe electrode.

According to a still further aspect of the present invention, there is provided an information-processing apparatus: comprising a recording medium having on the surface thereof an edge portion having a level difference larger than a recording recess-projection or having an electron state different from a recording electron state; a probe electrode capable of making access to the recording medium for processing operation including recording, reproduction, and erasing of information; a means for adjusting the gap between the recording medium and the probe electrode; a means for detecting the edge portion of the recording medium; a means of deciding the azimuth angle of a data line for recording and reproducing relative to the edge portion; a means for causing the probe electrode to scan to the azimuth of the data line starting from the edge portion; and a means for applying a pulse voltage for recording or erasing, or a bias voltage for reproducing information between the recording medium and the probe electrode.

BRIEF DESCRIPTION OF THE DRAWINGS

FIG. 12 illustrates signal waves at various portion on recording at the portions of the recording apparatus.

DESCRIPTION OF THE PREFERRED EMBODIMENT

The present invention enables high-density and high-speed access to information by providing a stepped portion having a level difference larger than a recording recess-projection or having an electron state different from a recording state (hereinafter referred to as an edge portion) and recording and reproducing information two-dimensionally. The width of the edge portion is not limited like in the groove formation, so that it can be formed by photolithography as employed in usual IC processes at a low cost by mass-production.

In the method of access of the present invention, the probe electrode detects the first edge portion, and then conduct scanning along the edge portion two-dimensionally to read data, enabling high speed access to a writing area.

The present invention is described in detail by reference to the figures.

Figure 1:
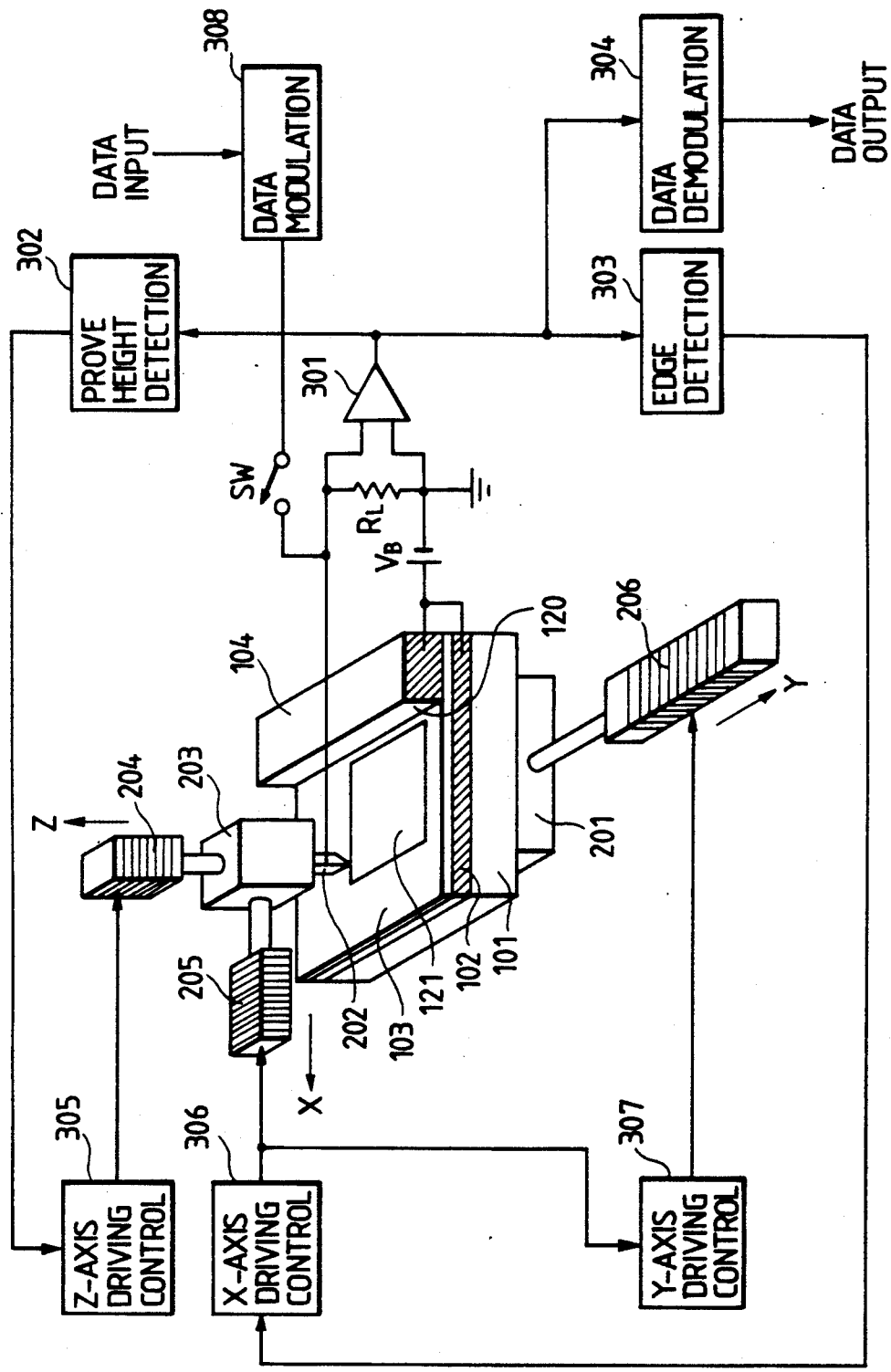
FIG. 1 illustrates the recording medium and the constitution and the method of access of the present invention.

FIG. 1 illustrates a main constitution of the recording medium and the access method of the present invention. The numeral 101 denotes a substrate of the recording medium; 102 a lower electrode; 103 a recording layer; 104 an electrode pattern of edge formation; 121 a recording-reproducing region; and 120 an edge portion.

A stage 201 supporting a recording medium is driven in the Y-axis direction by a linear actuator 206. A recording-reproducing head 203 supports a probe electrode 202, and is controlled in position by actuators 205 and 204 driving respectively in X-direction and Z-direction.

The distance between the surface of the recording medium and the probe electrode is controlled according to a tunnel current flowing between the surface of the recording medium and the probe electrode in such a manner that tunnel current caused by the bias voltage $V_B$ is detected by a loading resistance $R_L$, and is amplified by an amplifier 301, an appropriate probe height is decided by a probe-height-detecting circuit 302, and the probe height is adjusted by a Z-axis driving control circuit.

A recording-reproducing region 121 is decided based on the edge 120. The X-axis driving control circuit 306 and the actuator 205 drive the probe electrode 202 to scan along X-axis direction. When the probe electrode is brought close to the edge portion 120, the tunnel current abruptly increases between the probe electrode and the edge portion. This abrupt increase of the tunnel current is detected by an edge-detecting circuit 303. The detection signal reverses the scanning direction of the probe. After lapse of a predetermined time, the probe electrode reverses the scanning direction to scan toward the edge portion. On this reversal, a drive signal is sent to the Y-axis driving control circuit to shift the stage by one step width.

By repetition of the above operation, the probe electrode is allowed to scan the recording-reproducing region invariably along the edge portion at a certain angle to the edge portion.

In conducting recording on a recording medium, a writing voltage (a pulse voltage) is applied to the probe electrode from the data modulation circuit 308 through the switch SW by reference to the time of scanning reversal of the probe electrode to X-axis direction on detecting the edge portion 120. A series of data pulses are recorded during the time of scanning by the probe electrode in X-axis direction for a predetermined time until beginning of another scanning reversal toward the edge portion By conducting this writing operation every time the probe electrode detects the edge portion 120, a series of data in line is written in at a certain angle to the edge portion, and the stage is moved in Y-axis direction successively in synchronism with the writing, forming the region 121 in which data are recorded two-dimensionally.

In reproduction the probe electrode conducts scanning by reference to the edge portion in a similar manner as in the recording. The azimuth adjustment between the X-axis scanning direction of the probe electrode and the recorded data line may be conducted by a "wobbling method" as disclosed in Japanese Patent Publication No. 54-15727. Otherwise, correction may be made on demodulation of data by pattern-matching or the like technique after two-dimensional region-scanning.

In reproduction, a bias voltage is applied between the probe electrode and the recording medium.

Figure 2A:
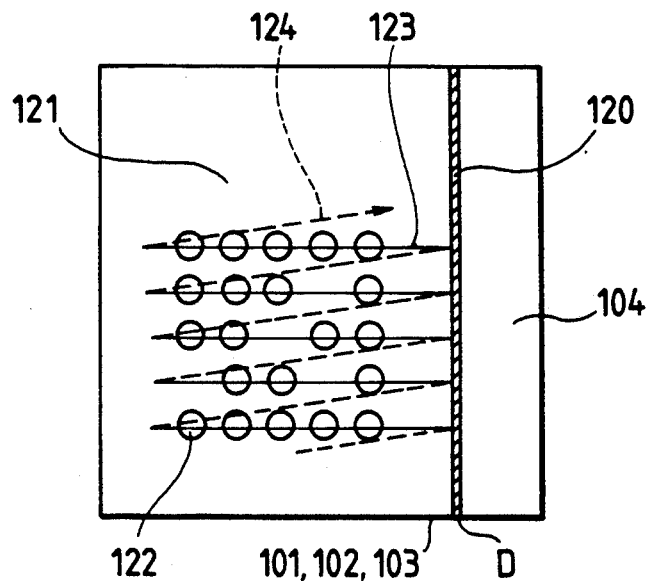
FIGS. 2A and 2B illustrates the operation of the present invention.

FIG. 2A illustrates a state of data recording on a surface of a recording medium. The numeral 122 denotes a recording bit of data; 123 (solid arrow line) a locus of the tip of the probe electrode when the probe is made to scan in the direction away from the edge portion; 124 (broken arrow line) a locus of the tip of the probe moving toward the edge portion.

Figure 2B:
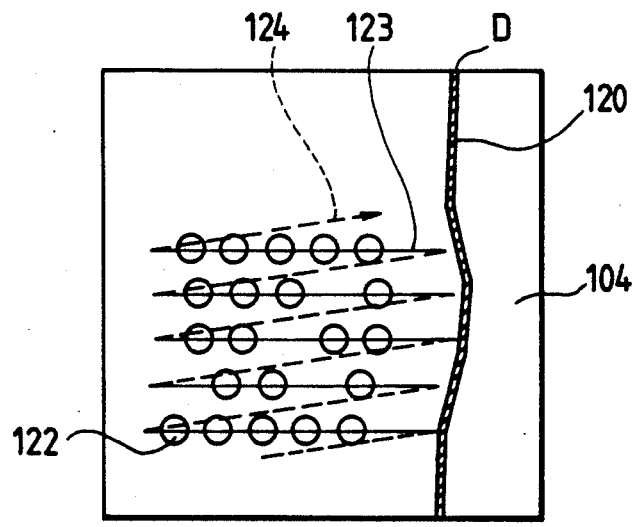

FIG. 2B illustrates the case where the edge portion 120 is not in a completely straight line but is irregular. Even in such a case, the line data is written in by following the edge portion without any inconvenience. Therefore, the allowance for accuracy of the shape of the finished edge portion is large, so that the edge may be in any shape such as a stripe, a spiral, and so forth.

In the method of the present invention, since the scanning is conducted two-dimensionally along the edge portion, the probe electrode can be brought to any desired data-recording region. For example, when a recording medium is newly installed in a recording-reproducing apparatus, the probe electrode is not precisely placed at the position of the recording region of the recording medium owing to mechanical inaccuracy of installing. This positional inaccuracy is usually in the range of from 10 to 100 $\mu$m, which is much larger than the size of the recording region. However, scanning by edge detection may facilitate finding of the data region and the tracking.

The recording layer employed for the recording medium of the present invention may be made of any material, insofar as the recording layer allows detection of the information written thereon by a tunnel current between the probe electrode and the recording layer. Examples of the material of the recording layer for recording by recess-projection formation on the surface include HOPG (Highly-Oriented-Pyrolithic-Graphite) cleavage substrates, Si wafers, metal thin films of Au, Ag, Pt, Mo, Cu, or the like formed by vacuum vapor deposition or epitaxial growth, and glassy metals like $Rh_{25}Zr_{75}$ and $Co_{35}Tb_{65}$. Examples of the material for recording by surface electronic state include thin film layers of amorphous Si, $\pi$-electron-conjugated organic compounds, and chalcogenoid compounds, and the like.

The shape of the recording medium and the material of the substrate of the present invention is not limited at all. The examples of the shape of the substrates include card-shaped or tape-shaped substrates suitable for forming edge portion in stripe, and disk-shaped substrates suitable for forming edge portions in spiral. The examples of the material of the substrates include cleavage crystal substrates such as HOPG, and mica, surface-ground crystal substrates of Si, sapphire, MgO, etc., molten quartz, Corning glass #7059, and so forth. As substrates for tape-shaped recording medium, polycarbonate resins, acrylic resins, PEEK, PET, nylons, may be used.

Recording medium example 1

Figure 3:
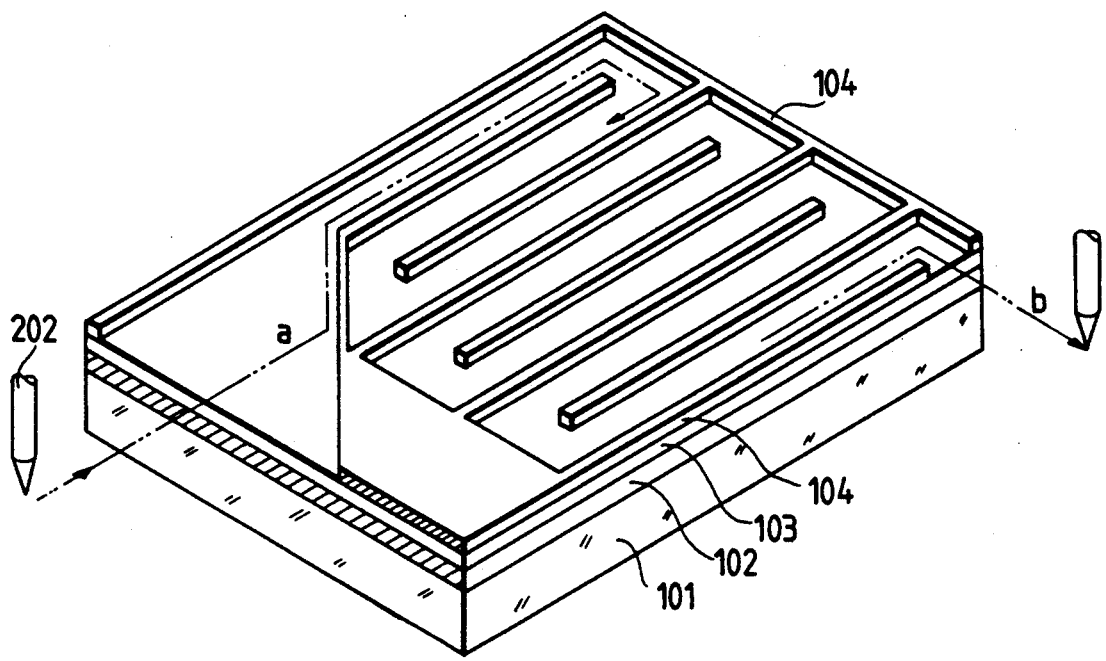
FIG. 3 illustrates a first embodiment of the recording medium of the present invention.

FIG. 3 illustrates a first embodiment of the recording medium of the present invention. The embodiment is described below by reference to the figure.

The numeral 101 denotes a substrate; 102 a lower electrode; 103 a recording layer; and 104 electrodes which forms an edge.

The probe electrode is introduced from the point "a", and conduct scanning successively along the edge of the stripe-shaped electrode 104, and thereafter is brought out from the point "b". At the entrance portion "a" for the probe electrode, the edge portion formed by the electrode 104 expands in a funnel shape to compensate the setting deviation between the probe electrode and the recording medium. Therefore, the probe electrode is guided by the funnel-shaped edge into the recording region.

Figure 6A:
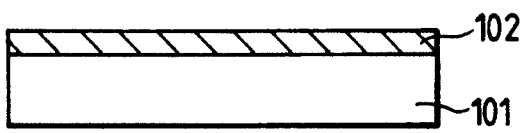
FIGS. 6A, 6B, and 6C illustrate a method for producing the recording medium shown in FIG. 3.
Figure 6B:
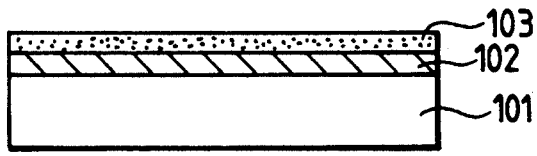
Figure 6C:
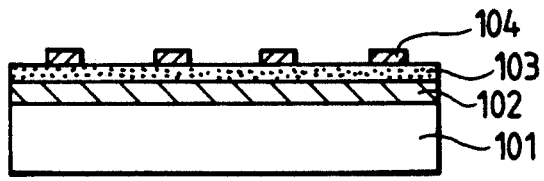

The process for producing the recording medium is described by cross-sectional views for respective steps by reference to FIGS. 6A to 6C.

As shown in FIG. 6A, on a substrate 101 of mica having been cleaved in the air, gold is made to grow epitaxially throughout the surface by vacuum deposition to form a lower electrode layer 102. The formation of the lower electrode layer was conducted at the conditions of a substrate temperature of 500° C., deposition rate of 10 Å/sec, deposition pressure of $5 \times 10^{-6}$ Torr, and film thickness of 5000 Å.

Subsequently, as shown in FIG. 6B, on the lower electrode 102, a two-layered monomolecular built-up film of polyimide in thickness of 8 Å is formed as a recording layer 103 by a Langmuir-Brodgett method.

The method for forming the polyimide monomolecular built-up film is described below in detail.

The polyamic acid represented by the formula (3) below is dissolved in N,N-dimethylacetamide (at the concentration of $1 \times 10^{-3}$M in terms of the monomer). Thereto, $1 \times 10-3$M N,N-dimethyloctadecylamine solution in the same solvent is mixed at a mixing ratio of 1:2 (V/V) to prepare a solution of the octadecylamine salt of the polyamic acid represented by the formula (4)

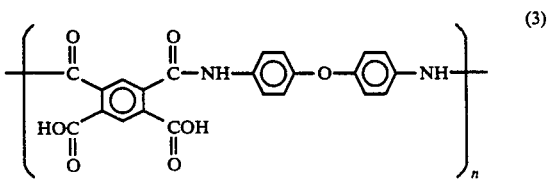

(3)

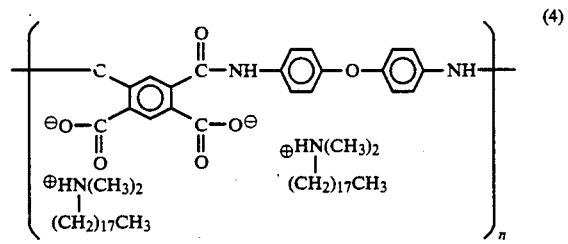

(4)

This solution is spread over the aqueous phase consisting of pure water at a temperature of 20° C. to form a monomolecular film on the surface of water. After evaporation of the solvent, the surface pressure was raised up to 25 mN/m. With the surface pressure kept constant, the aforementioned substrate having the lower electrode was dipped slowly into the water in a direction crossing the water surface at a rate of 5 mm/min, and then pulled up at a rate of 5 mm/min to form a two-layered Y-type monomolecular built-up film. Thereafter, the substrate is subjected to heat treatment of 300° C. for 10 minutes to convert the octadecylamine salt of the polyamic acid into an imide as shown in the formula (5), thereby forming a two-layered polyimide monomolecular built-up film.

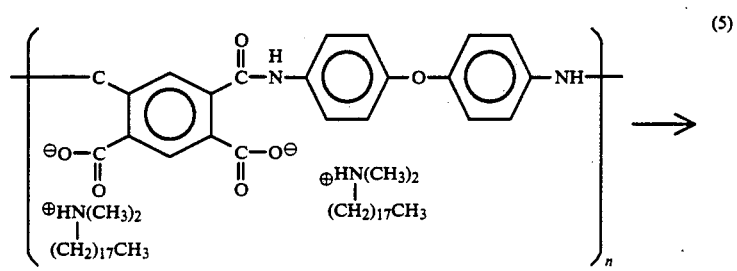

(5)

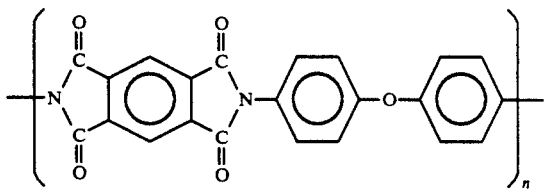

Subsequently, as illustrated in FIG. 6C, over the whole surface of the recording layer 103, gold is deposited in a thickness of 500 Å by vacuum vapor deposition, and the unnecessary portion of the metal pattern is eliminated by photolithographic etching with aqueous potassium iodide to form an edge-forming electrode 104 in a line width of 1 μm and a pitch of 2 μm.

Effect of Recording medium Example 1

The recording medium of Example 1 of the present invention is advantageous as below:

(1) The edge portion for tracking may be formed by photolithography, so that the recording medium is suitable for mass production and can be provided at low cost.

(2) The entrance portion for introducing the probe electrode to a recording region of the recording medium is readily formable, which broadens allowable range of mechanical accuracy of exchange and installation of the recording medium, and facilitates the design of the recording-reproducing apparatus.

Recording medium example 2

Figure 4:
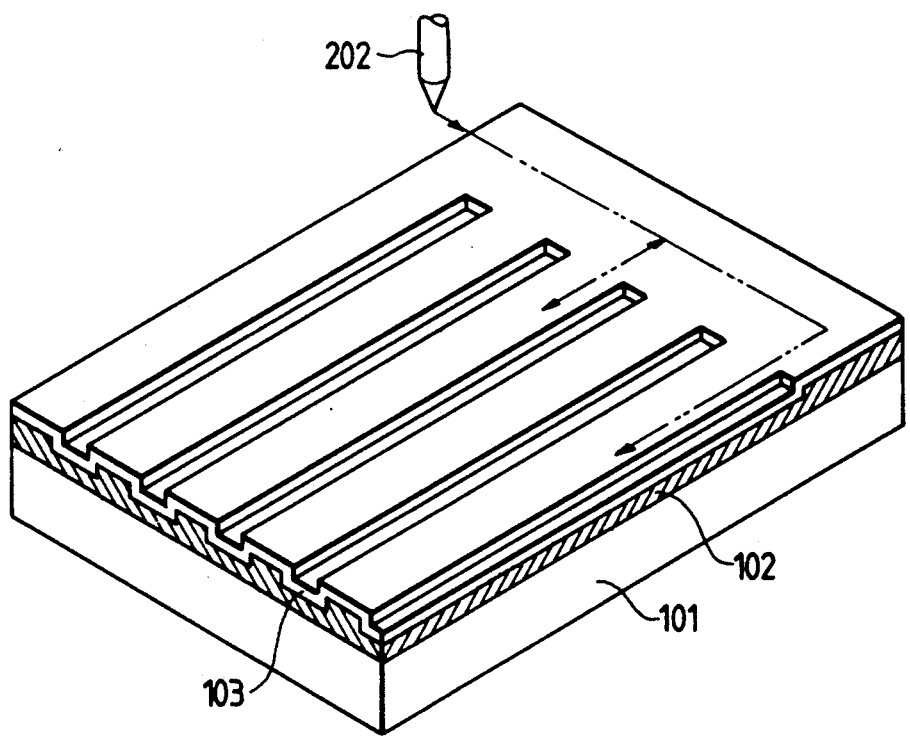
FIG. 4 illustrates a second embodiment of the recording medium of the present invention.

A second second embodiment of the recording medium of the present invention is illustrated in FIG. 4.

In FIG. 4, the numeral 101 denotes a substrate; 102 a lower electrode which forms the edge portion; and 103 a recording layer. A probe electrode 202 moves in a direction perpendicular to a stripe of the edge portion to make access to a desired track, namely a stripe in the edge portion. In each track, the probe electrode scans along the edge portion: in this example, the projecting side of the recording layer is the recording-reproducing region.

The process for producing this recording medium is described below by reference to cross-sectional views of FIGS. 7A to 7C for respective producing steps.

Figure 7A:
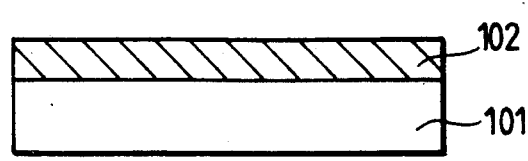
FIGS. 7A, 7B, and 7C illustrate a method for producing the recording medium shown in FIG. 4.

Firstly, as shown in FIG. 7A, gold is made to grow epitaxially on the whole surface of a mice substrate 101 having been cleaved in the air to form an electrode layer 102. The formation of the electrode layer 102 is conducted under the conditions of the substrate temperature of 500° C., the deposition rate of 10 Å/sec, the pressure of vapor deposition of $5 \times 10^{-6}$ Torr, and the film thickness of 5000 Å.

Figure 7B:
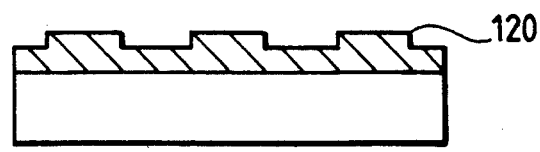

The electrode layer 102 is etched as shown in FIG. 7B by immersion in an etching solution composed of aqueous potassium iodide according to usual photolithographic etching to form a groove of 1 μm in line width, 2 μm in pitch, and 200 Å in depth, which becomes an electrode layer having a stepped portion 120 as the edge portion.

Figure 7C:
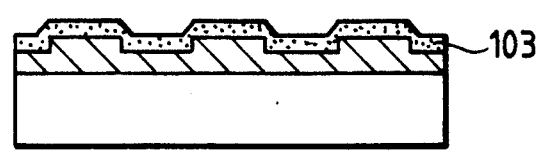

Subsequently, as shown in FIG. 7C, on the electrode layer 102, two-layered built-up film of 8 Å thick of a polyimide monomolecular built-up film is formed as a recording layer 103 according to an LB method.

The polyimide monomolecular built-up film is formed in the same manner as in Recording medium example 1 above.

Effect of Recording medium example 2

In the second example of the recording medium, the edge portion is formed by the lower electrode, so that the recording layer is not exposed to an etching solution in the photolithographic etching step for the edge formation. Thus, the recording layer is formed at the final step of production of the recording medium. Accordingly, in this example any kind of material may be employed for the recording layer.

Recording medium example 3

Figure 5A:
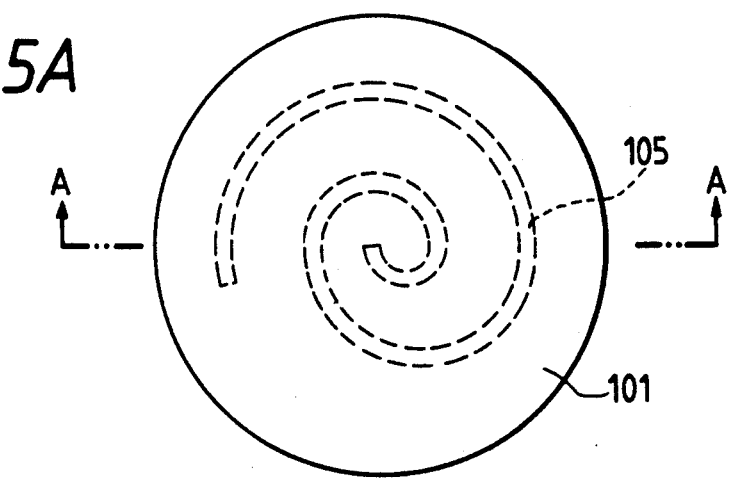
FIG. 5A illustrates a third embodiment of the recording medium of the present invention.
Figure 5B:
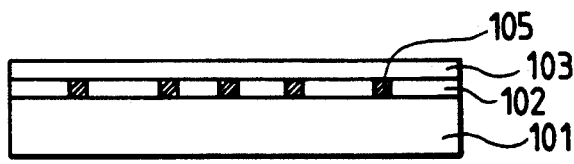
FIG. 5B is a cross-sectional view of the embodiment of FIG. 5A at the line A—A'.

A third embodiment of the recording medium of the present invention is shown in FIGS. 5A and 5B. FIG. 5A is a plan view, and FIG. 5B is a cross-sectional view at the line A—A' in FIG. 5A. In the figures, the numeral 101 denotes a substrate in a disk shape; 102 a lower electrode; 103 a recording medium; and 105 an edge portion formed by ion implantation.

This edge portion is formed in a spiral shape on a disk-shaped substrate. The probe electrode is introduced to the medium while the substrate is rotating, and the probe electrode moves from the periphery to the center of the disk or from the center to the periphery, conducting recording or reproduction.

The process for producing this recording medium is described below by reference to cross-sectional views of FIGS. 8A to 8C for respective producing steps.

Figure 8A:
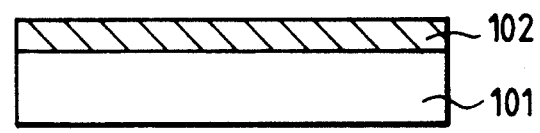
FIGS. 8A, 8B, and 8C illustrate a method for producing the recording medium shown in FIGS. 5A and 5B.

Firstly, as shown in FIG. 8A, gold is made to grow epitaxially on the whole surface of a mica substrate 101 having been cleaved in the air to form an electrode layer 102. The formation of the electrode is conducted under the conditions of the substrate temperature of 500° C., the deposition rate of 10 Å/sec, the pressure of vapor deposition of $5 \times 10^{-6}$ Torr, and the film thickness of 5000 Å.

Figure 8B:
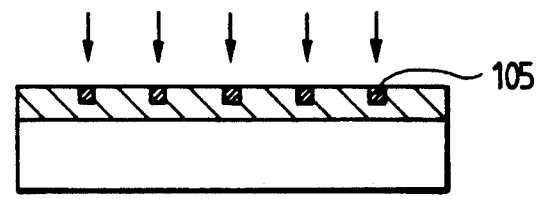

Secondly, as shown in FIG. 8B, elemental silicon is injected into the electrode layer 102 in the direction denoted by the arrow marks by means of a focusing ion beam apparatus at an accelerating voltage of 80 kV and at a dose of $10^{15}$ ions/cm$^2$ to form a modified portion 105 of 0.1 μm in width and 1.1 μm in pitch as the edge portion.

Figure 8C:
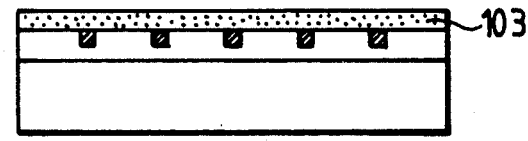

Subsequently, as shown in FIG. 8C, on the electrode layer 102, a two-layered polyimide monomolecular built-up film of 8 Å thick is formed as a recording layer 103 according to an LB method.

The polyimide monomolecular built-up film is formed in the same manner as in Recording medium example 1 above.

Effect of Recording medium example 3

The recording medium of the third example has advantages as below:

(1) An edge portion having an extremely small occupation area is formed by ion injection, which minimizes the area of non-recording-reproducing portion for the edge portion.

(2) The precision of position control of the ion injection may be about 0.1 to 0.2 μm for the edge formation pitch of 1.1 μm, which can be achieved satisfactorily by use of a usual stage of the apparatus. Therefore the the cost of the edge formation is low.

(3) The edge portion made in a spiral shape enables continuous recording-reproducing of a large volume of data without time of changeover for track access and without record gap, which is suitable for recording and reproducing animated images.

Access method example

Figure 9:
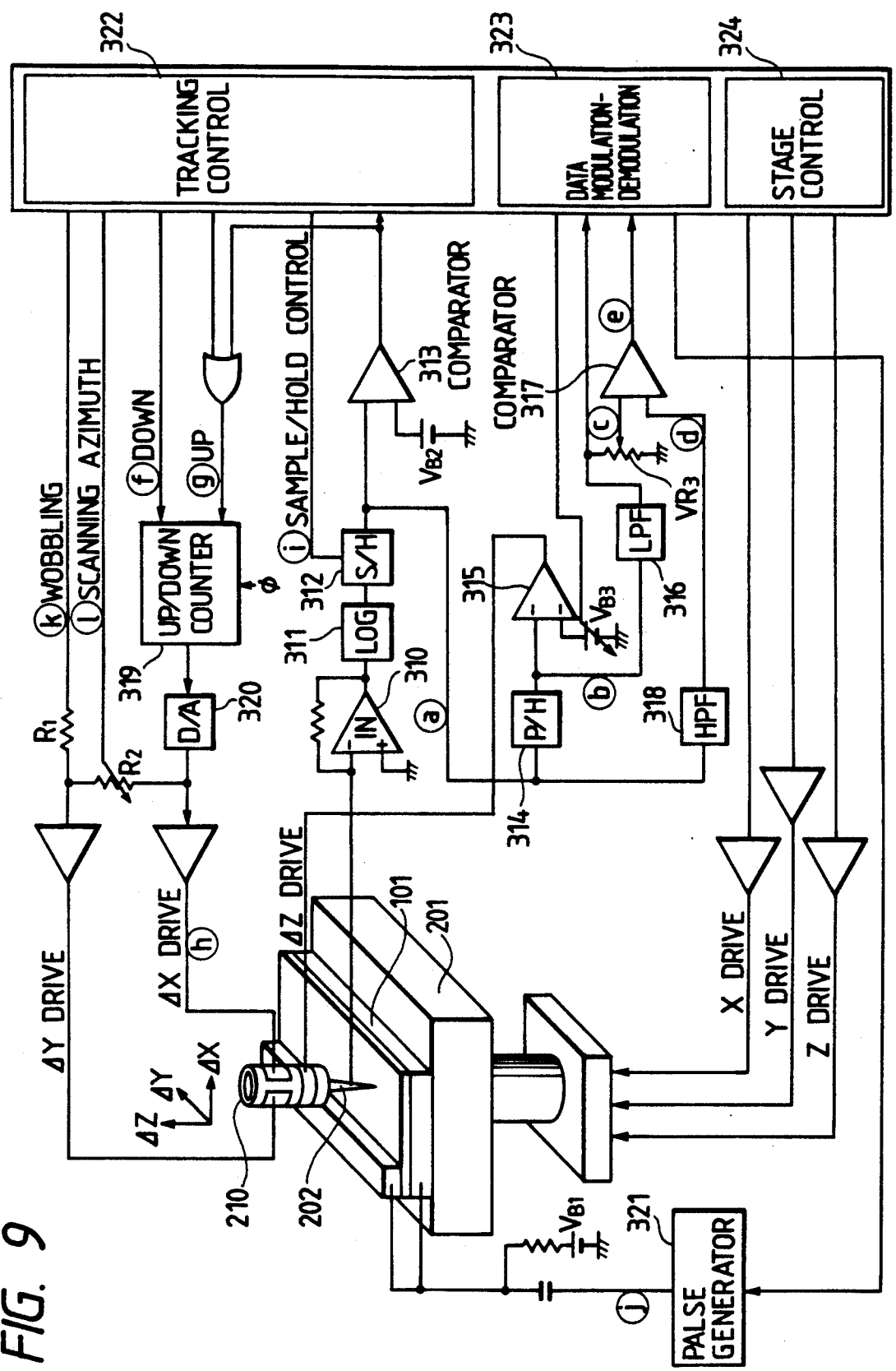
FIG. 9 illustrates a constitution of a recording-reproducing apparatus for practicing the access method of the present invention.

FIG. 9 illustrates an example of a constitution of a recording-reproducing apparatus for practicing the access method of the present invention.

Figure 10A:
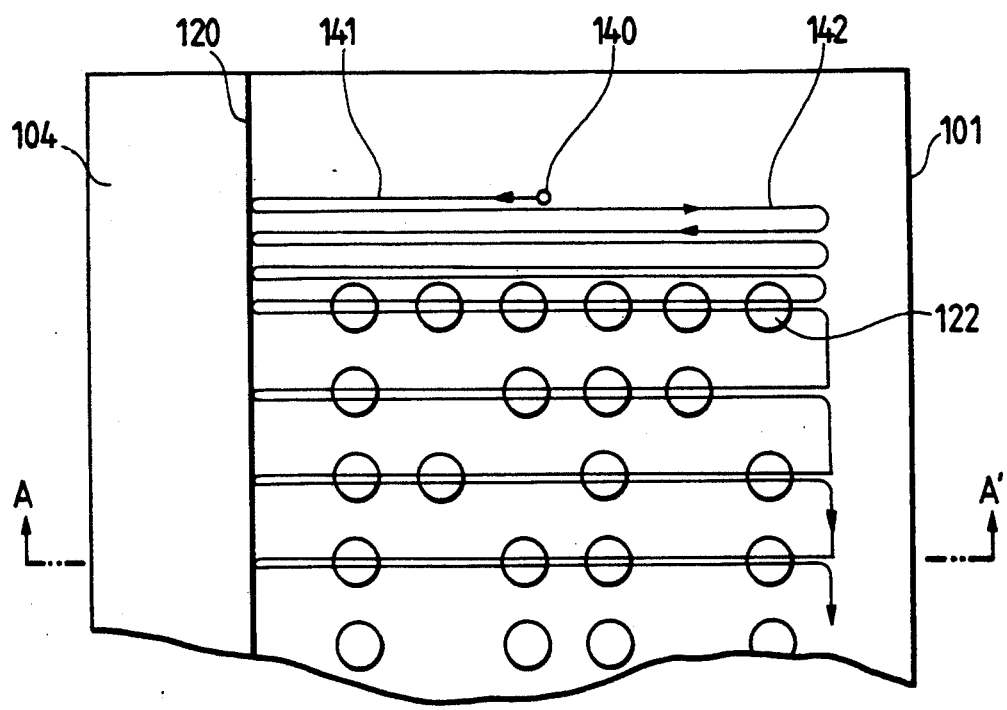
FIGS. 10A and 10B illustrate loci of the tip of a probe electrode on a surface of a recording medium of the recording-reproducing apparatus of FIG. 9.
Figure 10B:
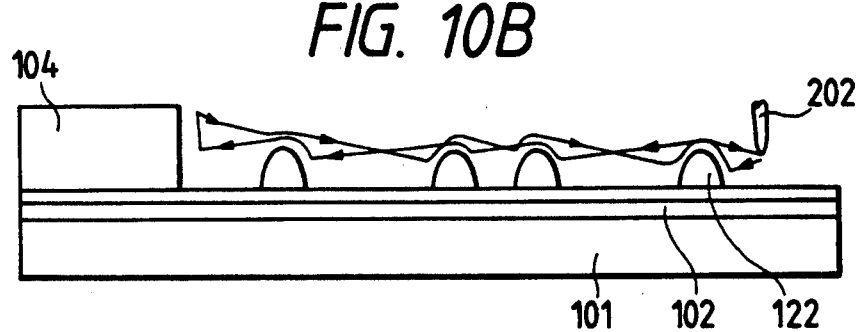
Figure 11:
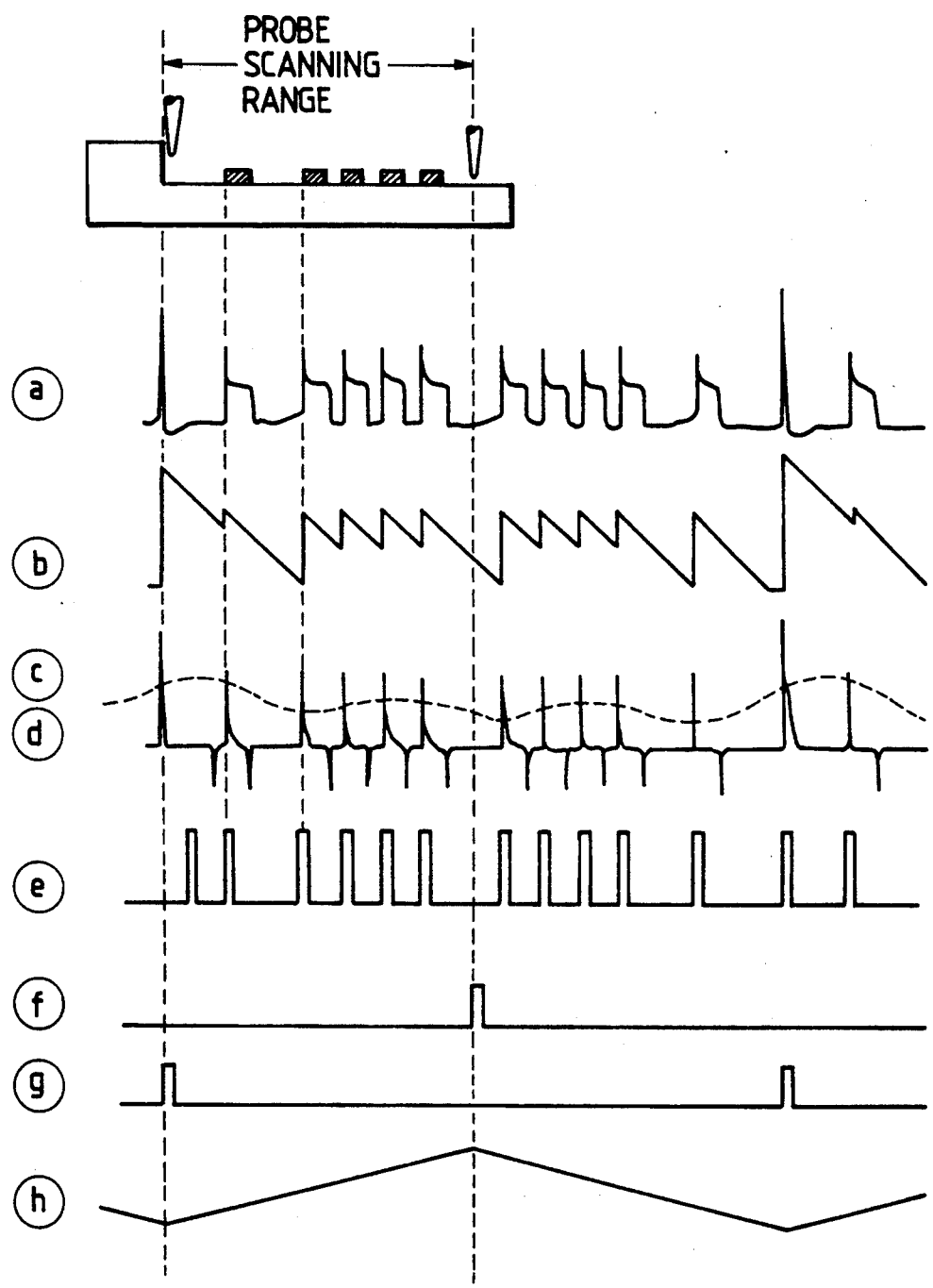
FIG. 11 illustrates signal waves on reproducing information with the recording-reproducing apparatus of the FIG. 9.

FIG. 10A and FIG. 10B illustrate loci of the tip of a probe electrode on a surface of a recording medium. FIG. 11 and FIG. 12 show examples of the wave forms of signal lines made by the recording-reproducing apparatus of FIG. 9 at the time of reproduction and recording. The description is made below by reference to figures.

The numeral 101 denotes a substrate of a recording medium. A stage 201 is movable in directions of X, Y, and Z within a range of 10 mm respectively to bring a probe electrode to any desired recording region on the recording medium. A cylindrical PZT actuator 210 is provided for scanning of a probe electrode 202 along a data line on the recording medium, and is movable in directions of X, Y, and Z within a range of 2 μm respectively.

The probe electrode 202 is connected to a current amplifier 310. The output from the current amplifier is inputted to a sample-and-hold circuit 312 via a logarithmic reducer circuit 311. An output signal (a) from the sample-and-hold circuit is inputted to a comparator 313, a peak-hold circuit 314, and a high-pass filter 318, respectively.

The output (b) from the peak-hold circuit 314 is connected to an error amplifier 315 and a low-pass filter 316. The output from the error amplifier is connected to a ΔZ-driving electrode of the cylindrical PZT. The output from the low-pass filter 316 is inputted to a comparator 317 via an attenuator VR₃.

The output (d) of the high-pass filter 318 is connected to another input of the comparator 317. Further, the output of the comparator 317 is inputted to a data modulator of a data modulation-demodulation section 323.

A data modulation output from the data modulation-demodulation section is connected to a pulse generator 321, and further connected to an electrode of the recording medium in combination with a DC bias voltage $V_{B1}$.

A tracking control section 322 drives the cylindrical PZT actuator 210 through an up/down counter 319 and a D/A converter 320. To the up-input (g) to the up/down counter 319, an OR gate for the output of the comparator 313 for edge detection and the up-control signal from the tracking control section 322 is connected. On the other hand, as the down-input (f) to the up/down counter 319, the down-control signal of the tracking control section is connected. The count output from the up/down counter, is converted to analogue voltage by the D/A converter 320, and drives the cylindrical PZT by a distance of ΔX. Further, the output from the D/A converter 320, after combined with a wobbling signal (k) through a variable resistance R₂ controlled by scanning azimuth control signal (l) and a resistance R₁, drives the cylindrical PZT by a distance of ΔY.

In the reproduction operation, the locus of the probe electrode 202 on the recording medium is as shown of data in FIG. 10A. The cylindrical PZT 210 starts scanning from the initial set position 140 of the probe on the stage 201, and scans data along the locus shown by the numeral 141. On detecting the edge 120, the probe reverses the scanning direction and follows the locus 142. After scanning a predetermined distance, it again reverses the scanning direction toward the edge 120.

When the probe electrode detects the data bit line 122 after the repetition of the above operation, it continues scanning sequentially by adjusting the scanning azimuth to follow the data line.

The scanning azimuth of the probe electrode is controlled by changing the variable resistance R₂ by the scanning azimuth control signal (l) to change the drive ratio of ΔX/ΔY of the cylindrical PZT actuator 210. The suitable scanning azimuth is decided, as shown in FIG. 9, by monitoring an envelope signal (c) holding the tunnel voltage peak resulting from ΔY drive by the wobbling voltage (k).

FIG. 10B shows the state of scanning of the probe electrode over a data line on the recoring medium as a cross-sectional view. The distance between the probe electrode and the surface of the recording medium is controlled by comparing a peakhold value of the logarithmically reduced tunnel current with the reference voltage $V_{B3}$, and driving the cylindrical PZT by a distance of ΔZ.

By this control, the probe electrode scans so as to envelop the projecting portions or the portions of the highest electron state of the data line.

The operation in the reproduction is described by reference to the timing chart of FIG. 11 showing the state of the respective signals.

The tunnel current detected by the probe electrode is amplified by the current amplifier 310 in FIG. 9, logarithmically reduced by the logarithmic reducer, and then inputted to the sample-and-hold circuit 312. This sample-and-hold circuit comes to be in a through state at the time of reproduction to pass directly the output from the logarithmic reducer.

The access of the probe electrode to the edge is detected by comparing the sample-and-hold output (a) and the threshold voltage $V_{B2}$ by an edge-detecting comparator. The $V_{B2}$ is set larger than the output voltage of the data line.

The signal of edge detection changes the up/down counter forcibly to up-count operation. After a certain number of counts, the counter is changed again to down-count operation. The control signals of up and down in the up/down counter is shown by (g) and (f) in FIG. 11. The output for ΔX drive is shown by (h) in FIG. 11.

These operations allows the probe electrode to scan without colliding against the edge of the recording medium.

From the sample-and-hold output (a), high frequency components, namely data information components, are extracted, and is compared with the suitable attenuated voltage of envelope signal (c) from the data line by means of the comparator 317 to obtain binary data (e). The respective input data to the comparator are shown by (c) and (d) in FIG. 11. The binary signal is shown by (e) in FIG. 11. Incidentally, the the envelope signal (c) is derived by integrating the peak-hold output (b) by means of the low-pass filter 316.

The operations at the recording is described by reference to the timing chart of FIG. 12 showing the states of respective signals.

When the access to the edge is detected by the comparator 313 by comparing the output signal (a) from the sample-and-hold circuit 312 with $V_{B2}$, writing operation is started by setting $V_{B3}$ at a predetermined level. After the control of the gap between the probe electrode and the recording medium has been stabilized, the sample-and-hold control signal (i) is set to the hold state by synchronizing with a data-writing-clock, and the pulse (j) is generated by the pulse generator 321. The writing of the data pulse is continued until the direction of scanning of the probe electrode is reversed. When the direction of the scanning of the probe electrode is reversed, the operation is changed to a readout state, and the the data-writing operation is kept standing-by until the next detection of the edge.

Effect of the access method of Example

As understood from the examples of the access method of the present invention, since the data line is written in by reference to the edge portion of the recording medium, the timing for the recorded data bit is precisely estimated in scanning of a data bit line with a probe electrode for readout. Accordingly the method of the present invention has advantages below.

(1) The azimuth of data line scanning is determined precisely by a wobbling method, or the like method.

(2) The timing for data sampling is precise, which enables high S/N ratio of readout.

(3) The edge may be discontinuous. If the probe electrode gets out of an edge, it detects the next edge and moves automatically between the tracks.

(4) Writing operation and reading operation is conducted independently of the shape of the edge, which gives exchangeability of recording medium regardless of the shape of the truck even with the one having a different truck shape.

(5) Since a peak-hold circuit is employed in the circuit for controlling the gap between a probe electrode and the surface of a recording medium, the probe electrode avoids any steep projection such as an edge with a high time constant, and if the probe electrode gets out of projected portion of a data bit, the probe electrode approaches to the surface of the recording medium with a low time constant. This operation manner decreases unnecessary up-and-down oscillation of the probe electrode insofar as possible, allowing extremely high-speed scanning of the probe electrode.

(6) By use of a gap control signal, namely a threshold voltage for binary treatment in data reproduction utilizing an envelope signal of data lines, disturbance of data bit signals caused by warpage or deformation of a substrate, or non-uniformity of sensitivity of a recording layer, and so forth can be compensated.

Effect of the Invention

The present invention, which provides an edge portion on a recording medium and conducting recording data lines two-dimensionally by reference to this edge, gives the advantages below.

(1) The edge of a recording medium may be satisfactorily formed by usual photolithography technique employed in silicon IC processes. Sufficient high-density of recording-reproducing is achievable even with a dimension of line width and line distance of micron order.

(2) Since the information necessary for tracking is on the edge, the region necessary for tracking is extremely small in principle. Accordingly, the recording density can be made larger to the maximum by employing ion beam processing or the like method for pattern preparation for edge formation.

(3) The production process for the recording medium has a high degree of freedom, so that a variety of shapes of substrates may be employed, and the material for the recording medium may be selected regardless of the process.

(4) The introduction portion for introducing the probe electrode to the recording medium may be formed on the recording medium. Therefore, a recording-medium exchange mechanism can readily be realized without requirement on dimensional accuracy of recording mediums.

(5) The tracking operation by reference to the edge is conducted on two-dimensional data region. Therefore, the processing time for tracking for one bit is extremely small, which enables high-speed readout and writing.

As discussed above, the effects of the present invention satisfies the requirements on the functions of memory of (1) high density and large volume of recording, (2) high response speed in recording-reproducing, and (3) high productivity and low cost.

What is claimed is:

1. A method of access of a probe electrode to a recording medium having on the surface thereof an edge portion having a level difference larger than a recording recess-projection or having an electron state different from a recording electron state: the method comprising steps of detecting the edge portion; causing the probe electrode to scan at a certain angle to the edge portion; and moving the recording medium to a direction along the edge portion.

2. The method of access of claim 1, wherein the edge portion is formed in a stripe shape.

3. The method of access of claim 1, wherein the edge portion is formed in a concentric circle shape or in a spiral shape.

4. The method of access of claim 1, wherein the recording medium comprises a probe electrode introducing means to guide the probe electrode to a top position of the recording-reproducing region.

5. A method of access of a probe electrode to a recording medium having on the surface thereof an edge portion having a level difference larger than a recording recess-projection or having an electron state different from a recording electron state: the method comprising steps of detecting the edge portion; deciding an azimuth angle of a data line to the edge portion; and causing the probe electrode to scan starting from the edge portion to the azimuth of the data line.

6. The method of access of claim 5, wherein the edge portion is formed in a stripe shape.

7. The method of access of claim 5, wherein the edge portion is formed in a concentric circle shape or in a spiral shape.

8. The method of access of claim 5, wherein the recording medium comprises a probe electrode introducing means to guide the probe electrode to a top position of the recording-reproducing region.

9. A method for processing information including recording, reproducing, and erasing of information by access of a probe electrode to a recording medium having on the surface thereof an edge portion having a level difference larger than a recording recess-projection or having an electron state different from a recording electron state: the method comprising steps of detecting the edge portion; causing the probe electrode to scan at a certain angle to the edge portion; and applying a pulse voltage for recording or erasing, or a bias voltage for reproducing information between the recording medium and the probe electrode.

10. The method for processing information of claim 9, wherein the edge portion is formed in a stripe shape.

11. The method for processing information of claim 9, wherein the edge portion is formed in a concentric circle shape or in a spiral shape.

12. The method for processing information of claim 9, wherein the recording medium comprises a probe electrode introducing means to guide the probe electrode to a top position of the recording-reproducing region.

13. A method for processing information including recording, reproducing, and erasing of information by making access of a probe electrode to a recording medium having on the surface thereof an edge portion having a level difference larger than a recording recess-projection or having an electron state different from a recording electron state: the method comprising steps of detecting the edge portion; deciding an azimuth angle of a data line to the edge portion; causing the probe electrode to scan starting from the edge portion to the direction of the azimuth of the data line; and applying a pulse voltage for recording or erasing, or a bias voltage for reproducing information between the recording medium and the probe electrode.

14. The method for processing information of claim 13, wherein the edge portion is formed in a stripe shape.

15. The method for processing information of claim 13, wherein the edge portion is formed in a concentric circle shape or in a spiral shape.

16. The method for processing information of claim 13, wherein the recording medium comprises a probe electrode introducing means to guide the probe electrode to a top position of the recording-reproducing region.

17. An information-processing apparatus: comprising a recording medium having on the surface thereof an edge portion having a level difference larger than a recording recess-projection or having an electron state different from a recording electron state; a probe electrode capable of making access to the recording medium for processing operation including recording, reproduction, and erasing of information; a means for adjusting the gap between the recording medium and the probe electrode; a means for detecting the edge portion of the recording medium; a means for causing the probe electrode to scan at a certain angle relative to the recording medium starting from the edge portion; and a means for applying a pulse voltage for recording or erasing, or a bias voltage for reproducing between the recording medium and the probe electrode.

18. The information processing apparatus of claim 17, wherein the edge portion is formed in a stripe shape.

19. The information processing apparatus of claim 17, wherein the edge portion is formed in a concentric circle shape or in a spiral shape.

20. The information processing apparatus of claim 17, wherein the recording medium comprises a probe electrode introducing means to guide the probe electrode to a top position of the recording-reproducing region.

21. An information-processing apparatus: comprising a recording medium having on the surface thereof an edge portion having a level difference larger than a recording recess-projection or having an electron state different from a recording electron state; a probe electrode capable of making access to the recording medium for processing operation including recording, reproduction, and erasing of information; a means for adjusting the gap between the recording medium and the probe electrode; a means for detecting the edge portion of the recording medium; a means of deciding the azimuth angle of a data line for recording and reproducing relative to the edge portion; a means for causing the probe electrode to scan to the azimuth of the data line starting from the edge portion; and a means for applying a pulse voltage for recording or erasing, or a bias voltage for reproducing information between the recording medium and the probe electrode.

22. The information processing apparatus of claim 21, wherein the edge portion is formed in a stripe shape.

23. The information processing apparatus of claim 21, wherein the edge portion is formed in a concentric circle shape or in a spiral shape.

24. The information processing apparatus of claim 21, wherein the recording medium comprises a probe electrode introducing means to guide the probe electrode to a top position of the recording-reproducing region.

* * * * *

UNITED STATES PATENT AND TRADEMARK OFFICE
CERTIFICATE OF CORRECTION

PATENT NO. : 5,199,021          Page 1 of 8
DATED : March 30, 1993
INVENTOR(S) : Katsunori Hatanaka, et al.

It is certified that error appears in the above-identified patent and that said Letters Patent is hereby corrected as shown below:

IN THE ABSTRACT

Line 8, "to" should read --in--.

IN THE DRAWINGS

FIGURE 1

In element 302 "PROVE HEIGHT DETECTION" should read --PROBE HEIGHT DETECTION--.

FIGURE 9

In element 321 "PALSE GENERATOR" should read --PULSE GENERATOR--.

IN THE DISCLOSURE

COLUMN 1

Line 23, "in" should read --in the--;
Line 36, "laser" should read --the laser--;
Line 38, "utizizes" should read --utilize--;
Line 45, "Binnig et al." should read --Binning et al.--;
Line 51, "Therefor" should read --Therefore--; and
Line 52, "a" should be deleted.

UNITED STATES PATENT AND TRADEMARK OFFICE
CERTIFICATE OF CORRECTION

PATENT NO. : 5,199,021

DATED : March 30, 1993

INVENTOR(S) : Katsunori Hatanaka, et al.

It is certified that error appears in the above-identified patent and that said Letters Patent is hereby corrected as shown below:

COLUMN 2

Line 34, "151035]" should read --1-151035].--;
Line 45, "disadvntages" should read --disadvantages--;
Line 49, "areally" should read --in an area--;
Line 52, "have" should read --has--; and
Line 65, "requires" should read --requires a--.

COLUMN 3

Line 6, "in" should read --in a--;
Line 9, "in" should read --in a--;
Line 33, "to" should read --to a--; and
Line 48, "to" should read --in--.

COLUMN 4

Line 27, "for" should read --for a--;
Line 44, "for" should read --for a--;
Line 48, "of" should read --for--; and
Line 61, "illustrates" should read --illustrate--.

UNITED STATES PATENT AND TRADEMARK OFFICE
CERTIFICATE OF CORRECTION

PATENT NO. : 5,199,021
DATED : March 30, 1993
INVENTOR(S) : Katsunori Hatanaka, et al.

It is certified that error appears in the above-indentified patent and that said Letters Patent is hereby corrected as shown below:

COLUMN 5

Line 17, "FIG. 9." should read "FIG. 9 apparatus.--
    Line 18, "portion" should read --portions--;
    Line 35, "conduct" should read --conducts--;
    Line 42, "The" should read --Reference--;
    Line 50, "in" should read --in the--; and
    Line 65, "along" should read --along the--.

COLUMN 6

Line 16, "to" should read --to the--;
    Line 19, "in" should read --in the--;
    Line 20, "of" should be deleted;
    Line 21, "portion" should read --portion.--; and
    Line 25, "in" should read --in the--.

COLUMN 7

Line 20, "edge" should read --an edge--;
    Line 21, "in" should read --in a--;
    Line 26, "for" should read --for a--;
    Line 27, "PET," should read --PET, and--;
    Line 32, "the" should read --that--;
    Line 33, "The" should read --Reference--;
    Line 35, "forms" should read --form--;
    Line 37, "conduct" should read --conducts--; and
    Line 41, "compensate" should read --compensate for--.

UNITED STATES PATENT AND TRADEMARK OFFICE
CERTIFICATE OF CORRECTION

PATENT NO. : 5,199,021
DATED : March 30, 1993
INVENTOR(S) : Katsunori Hatanaka, et al.

It is certified that error appears in the above-indentified patent and that said Letters Patent is hereby corrected as shown below:

COLUMN 8

Line 7, "Langmuir-Brodgett" should read --Langmuir-Blodgett--;
Line 13, "1x10-3M" should read --$1 \times 10^{-3}$M--;
Formula (4), the upper left-most carbon molecule should be in a double bond with an oxygen molecule;
Line 39, "of" should read --of the--; and
Formula (5), the upper left-most carbon molecule should be in a double bond with an oxygen molecule;

COLUMN 9

Line 27, "broadens" should read --broadens the--;
Line 32, "second second" should read --second--;
Line 34, "the" should read --reference--;
Line 47, "mice" should read --mica--;
Line 62, "two-layered" should read --a two-layered--; and
Line 66, "Recording medium" should read --the recording medium of--.

COLUMN 10

Line 24, "the" (first occurrence) should read --these--, and "the" (second occurrence) should read --reference--;
Line 57, "Recording medium" should read --the recording medium of--; and
Line 64, "of" should read --of the--.

UNITED STATES PATENT AND TRADEMARK OFFICE
CERTIFICATE OF CORRECTION

PATENT NO. : 5,199,021
DATED : March 30, 1993
INVENTOR(S) : Katsunori Hatanaka, et al.

It is certified that error appears in the above-indentified patent and that said Letters Patent is hereby corrected as shown below:

COLUMN 11

Line 1, "the the" should read --the--;
Line 18, "figures." should read --these figures.--;
Line 19, "The" should read --Reference--;
Line 24, "of" should be deleted;
Line 59, "analogue" should read --analog--;
Line 62, "after" should read --after being--; and
Line 68, "of" should read --by--.

COLUMN 12

Line 21, "recoring" should read --recording--;
Line 47, "to" should read --to an--;
Line 48, "to" should read --to a--;
Line 50, "is" should read --are--;
Line 53, "allows" should read --allow--;
Line 58, "is" should read --are--;
Line 63, "the the" should read --the--; and
Line 66, "The" should read --The recording--, and "at the recording is" should read --are--.

UNITED STATES PATENT AND TRADEMARK OFFICE
CERTIFICATE OF CORRECTION

PATENT NO. : 5,199,021
DATED : March 30, 1993
INVENTOR(S) : Katsunori Hatanaka, et al.

It is certified that error appears in the above-indentified patent and that said Letters Patent is hereby corrected as shown below:

COLUMN 13

Line 3, "writing" should read --a writing--;
Line 14, "the the" should read --the--;
Line 16, "of" should read --of the--;
Line 17, "As" should read --As is--;
Line 23, "has" should read --has the--;
Line 25, "the" should read --a--;
Line 31, "Writing" should read --A writing--;
Line 33, "of" should read --of the--;
Line 34, "truck" should read --track--;
Line 35, "truck" should read --track--;
Line 41, "projected" should read --a projected--;
Line 42, "to" should be deleted;
Line 60, "technique" should read --techniques--;

Line 63, "of line" should read --of a line--.

COLUMN 14

Line 1, "the" should read --a--;
Line 12, "requirement on" should read --requirements of--;
Line 15, "on" should read --on a--;
Line 28, "state:" should read --state,--;
Line 29, "of" should read --of:--;
Line 31, "to" should read --in--;
Line 36, "in a" should read --in one of a--, and "or in" should read --and--;

UNITED STATES PATENT AND TRADEMARK OFFICE
CERTIFICATE OF CORRECTION

PATENT NO. : 5,199,021
DATED : March 30, 1993
INVENTOR(S) : Katsunori Hatanaka, et al.

It is certified that error appears in the above-indentified patent and that said Letters Patent is hereby corrected as shown below:

COLUMN 14

Line 46, "state:" should read --state,--;
    Line 47, "of" should read --of:--;
    Line 54, "in a" should read --in one of a--, and "or in" should read --and--; and
    Line 66, "state:" should read --state,--, and "of" should read --of:--.

COLUMN 15

Line 7, "in a" should read --in one of a--;
    Line 8, "or in" should read --and--;
    Line 19, "state:" should read --state,--;
    Line 20, "of" should read --of:--;
    Line 30, "in a" should read --in one of a--;
    Line 31, "or in" should read --and--;
    Line 37, "apparatus: comprising" should read --apparatus comprising:--; and
    Line 43, "for" should read --for a--.

UNITED STATES PATENT AND TRADEMARK OFFICE
CERTIFICATE OF CORRECTION

PATENT NO. : 5,199,021
DATED : March 30, 1993
INVENTOR(S) : Katsunori Hatanaka, et al.

It is certified that error appears in the above-indentified patent and that said Letters Patent is hereby corrected as shown below:

COLUMN 16

Line 11, "in a" should read --in one of a--;
Line 12, "or in" should read --and--;
Line 17, "apparatus:  comprising" should read --apparatus comprising:--
Line 23, "for" should read --for a--;
Line 39, "in a" should read --in one of a--; and
Line 40, "or in" should read --and--.

Signed and Sealed this

Third Day of May, 1994

Attest:

BRUCE LEHMAN

Attesting Officer      Commissioner of Patents and Trademarks